Nov. 6, 1928.
H. BILODEAU
INDIVIDUAL CAKE MOLD
Filed Oct. 26, 1927
1,690,526
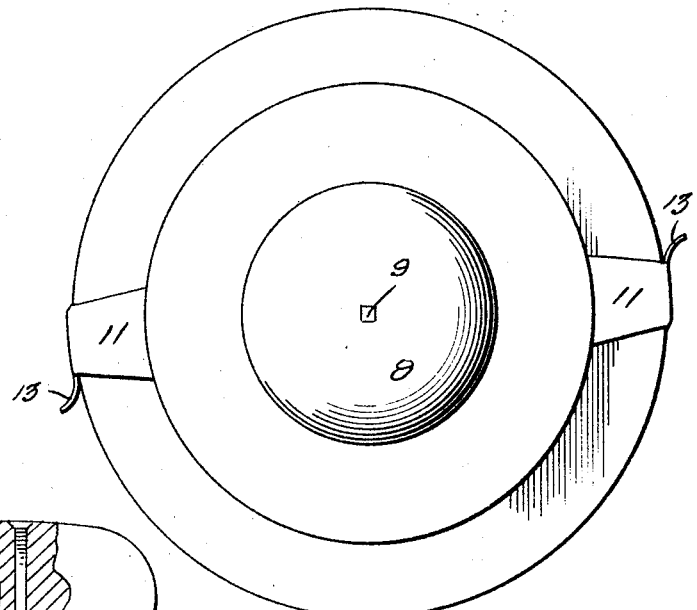
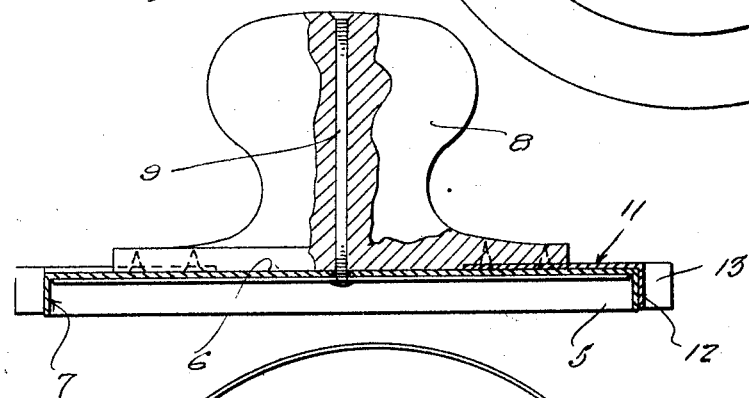
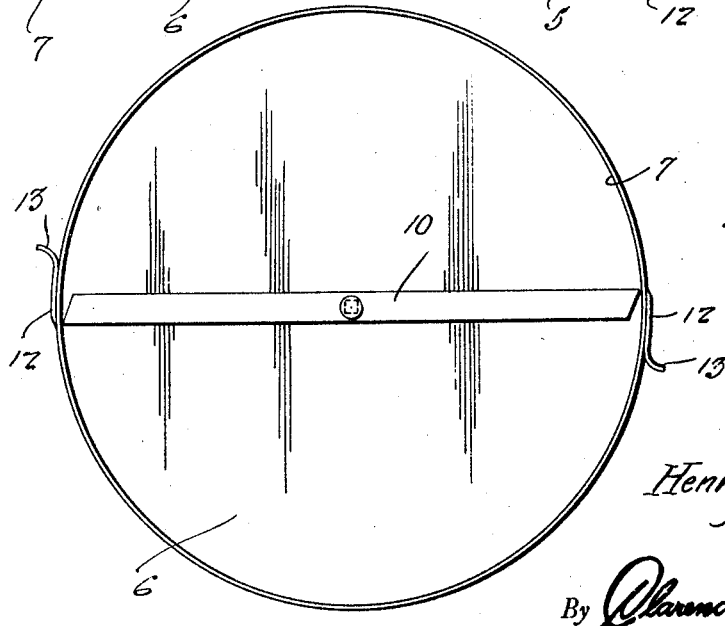
Inventor
Henry Bilodeau
By Clarence A. O'Brien
Attorney Patented Nov. 6, 1928.

1,690,526

UNITED STATES PATENT OFFICE.

HENRY BILODEAU, OF WILKES-BARRE, PENNSYLVANIA.

INDIVIDUAL CAKE MOLD.

Application filed October 26, 1927. Serial No. 228,789.

The present invention relates to individual cake molds for forming smooth compositions into cakes of a uniform size and is adapted particularly for use in forming meat cakes into a desired size and shape prior to cooking the same.

An object of the invention is to provide a mold of this character wherein the food may be formed into a uniform size and shape and provided with a pair of scrapers at diametrically opposite sides of the mold for collecting the unused portions of the food about the edge of the mold so as to prevent the waste thereof.

A further object is to provide an article of this character of simple and practical construction, neat and attractive in appearance, sanitary, inexpensive to manufacture and otherwise well adapted for the purpose for which the same is intended.

Other objects and advantages reside in the special construction and combination of the various elements comprising the invention, reference being had to the accompanying drawings forming a part hereof, wherein:

Figure 1 is a top plan view,

Figure 2 is a vertical sectional view therethrough, and

Figure 3 is a bottom plan view.

Referring now to the drawings in detail, the invention comprises a relatively shallow mold indicated at 5 of circular formation and including a horizontal plate section 6 with a flange 7 extending downwardly therefrom about the edges thereof in the form of a wall.

A handle 8 is mounted upon the upper surface of the plate and retained in position thereon by a vertically extending spindle 9 freely inserted through a central opening formed in the plate and extending slightly beneath the same. The end of the spindle 9 beneath the plate is square shaped in cross section as shown in Figure 3 of the drawings and upon which is mounted a horizontally and diametrically disposed knife 10 extending diametrically across the under side of the plate.

At the under side of the base of the handle 8 and at diametrically opposite sides thereof is arranged a pair of outwardly extending arms 11 having their outer ends 12 turned downwardly over the outer surface of the walls 7 with an arcuate shaped scraper 13 formed thereon. The inner face of each of the scrapers 13 open in a uniform direction with respect to the edge of the mold so that upon the rotation of the same the scrapers will operate to collect any material along the edge thereof and form the same into piles at opposite sides of the mold. From an inspection of Figure 2 of the drawing, it will be observed that the lower edges of the scrapers 13 are disposed slightly above the lower edge of the walls 7 whereby to enable the scrapers to freely rotate about the walls of the mold without any binding action on the surface upon which the food is placed.

In the operation of the device it will be apparent that the mold may be pressed down upon a quantity of food whereupon a portion thereof will be shaped in conformity with the interior of the mold. Pressure upon the handle 8 will enable the lower edges of the wall 7 to tightly engage the surface upon which the food is placed to prevent rotation of the mold while at the same time permitting rotation of the handle whereupon the knife 10 will separate the food from the under side of the plate 6. At the same time the scraper 13 rotating about the outer wall will collect any surplus quantity of the food in two piles at opposite sides of the mold.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

1. In an article of the class described, a plate having a wall extending downwardly about the edges thereof, a handle member rotatably mounted above the plate, a knife arranged at the under side of the plate and operatively connected with the handle member, and a pair of scrapers attached to said handle member and arranged for rotation about the outer edge of said wall.

2. In an article of the class described, a circular plate having a downwardly depending wall formed about the edge thereof, a handle member rotatably mounted upon the upper surface of the plate, a spindle carried by the handle member extending through the plate, a knife attached to the lower end of said spindle and arranged in scraping relation with the under side of the plate, a pair of arms extending radially at diametrically opposite sides of the handle member, and scrapers formed at the outer ends of said arms and arranged for rotation about the outer surface of said wall.

In testimony whereof I affix my signature.

HENRY BILODEAU.